(12) United States Patent
Vijayvergiya

(10) Patent No.: US 10,736,341 B1
(45) Date of Patent: Aug. 11, 2020

(54) ELECTROLYTE-FORTIFIED CARBONATED BEVERAGE COMPOSITIONS

(71) Applicant: The DrinkBryte Company, LLC, Irvine, CA (US)

(72) Inventor: Chetan Vijayvergiya, Maplewood, NJ (US)

(*) Notice: Subject to any disclaimer, the term of this patent is extended or adjusted under 35 U.S.C. 154(b) by 477 days.

(21) Appl. No.: 15/439,422

(22) Filed: Feb. 22, 2017

Related U.S. Application Data

(60) Provisional application No. 62/298,505, filed on Feb. 23, 2016.

(51) Int. Cl.
*A23L 2/52* (2006.01)

(52) U.S. Cl.
CPC .............. *A23L 2/52* (2013.01); *A23V 2002/00* (2013.01)

(58) Field of Classification Search
CPC .............................. A23L 2/52; A23V 2002/00
USPC ............................................ 426/74, 590, 477
See application file for complete search history.

(56) References Cited

U.S. PATENT DOCUMENTS

| | | | |
|---|---|---|---|
| 2013/0171294 A1* | 7/2013 | Martyn | |
| 2013/0183399 A1* | 7/2013 | Blow et al. | |
| 2014/0161955 A1* | 6/2014 | Wadhwa | |
| 2014/0220221 A1* | 8/2014 | Del Pozo et al. | |
| 2015/0196579 A1* | 7/2015 | Ferrante et al. | |

* cited by examiner

*Primary Examiner* — Helen F Heggestad
(74) *Attorney, Agent, or Firm* — Vorys, Sater, Seymour and Pease LLP

(57) ABSTRACT

A carbonated water beverage having electrolytes to provide cations including potassium, sodium, calcium and magnesium cations. The carbonated water beverage also is substantially sulfate-free and has a total cation fluid concentration of at least 10 mmol/l.

11 Claims, No Drawings

ELECTROLYTE-FORTIFIED CARBONATED BEVERAGE COMPOSITIONS

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright The DrinkBryte Company 2016, All Rights Reserved.

BACKGROUND

The U.S. Food and Drug Administration (the "FDA") defines "functional foods" as "food components that provide a health benefit beyond basic nutrition." Typically, such functional foods are fortified with nutritional and/or disease-preventing components, such as vitamins, minerals, antioxidants, amino acids, probiotics, fiber, etc.

Functional foods are presently a small but growing proportion of the overall U.S. food market, with functional beverages comprising more than one third of the functional food market. Commercially available functional beverages include sports drinks, such as Gatorade®, that claim to rehydrate the body by replenishing electrolytes that are lost in sweat. The original Gatorade® Thirst Quencher incorporates monopotassium phosphate and sodium citrate as the primary electrolytes to provide a total fluid concentration of potassium and sodium ions of about 23 mmol per liter (based on 160 mg sodium and 45 mg potassium per 12 fl. oz.). The Gatorade® Endurance formula contains higher concentrations of potassium and sodium ions, about 37 mmol per liter total fluid concentration (based on 300 mg sodium and 140 mg potassium per 12 fl. oz.) and also includes small amounts of magnesium and calcium ions but not in amounts required by the FDA to be disclosed on the nutrition label. All formulas of Gatorade® also contain sweeteners and flavors that can mask the taste of the added electrolytes.

Consumers interested in the potential rehydration benefits of a sports drink like Gatorade® without consuming sweeteners and artificial colors and flavors can turn to electrolyte-fortified waters, such as Propel® Electrolyte Water and Smartwater®. For most electrolyte-containing waters, including Smartwater®, electrolytes are added "for taste only", in amounts that are not required by the FDA to be disclosed. Propel® Electrolyte Water, however, is marketed as "pure, unflavored water with Gatorade-level electrolytes", and incorporates sodium bicarbonate, potassium bicarbonate and magnesium sulfate to contains sodium, potassium and magnesium ions at a total fluid concentration of about 24.6 mmol per liter (based on 230 mg sodium, 65 mg potassium and 16 mg magnesium (4% DV based on daily value of 400 mg) per 16.9 fl. oz.).

Some people prefer the taste and sensation of carbonated water rather than still water. There presently is no carbonated water beverage commercially available that provides sports drink levels of electrolytes and rehydration benefits. Club sodas typically contain trace amounts of sodium and potassium salts added for taste, and even Smartwater Sparkling, which advertises itself as "electrolyte-enhanced," contains only "electrolytes added for taste" with the amounts of calcium chloride, magnesium chloride and potassium bicarbonate being too small to be listed.

Thus, there exists a need for a carbonated water beverage that provides sports drink levels of electrolytes and rehydration benefits.

DETAILED DESCRIPTION

The present disclosure provides a carbonated beverage composition of water and electrolytes that provide at least potassium, sodium, calcium and magnesium cations at a total fluid concentration of at least about 10 mmol per liter and is substantially sulfate-free. As used in the present disclosure, "substantially sulfate-free" means that no sulfate-containing salt is added as an electrolyte component into the carbonated beverage composition. Thus, "substantially sulfate-free" still allows the carbonated beverage compositions of the present disclosure to contain trace amounts of sulfates that may be present, for example, from the mineral water or spring water that may be used as a starting material.

In developing the carbonated beverage compositions of the present disclosure, electrolytes were selected by balancing taste, solubility and ion-ion interaction to produce an electrolyte-enhanced carbonated beverage composition that is clear and has a comparable taste and feel to regular club soda. It was found that sulfate-containing electrolyte salts, such as magnesium sulfate (and hydrates thereof), imparted a slightly sulfurous taste/smell to the beverage compositions (perhaps enhanced by carbonation, which is known generally to convey aromatic compounds to the nose and so heighten flavor perception) and so are not desirable to be used according to this present disclosure.

The electrolyte-enhanced carbonated beverage compositions according to the present disclosure contain at least potassium, sodium, magnesium and calcium ions in concentrations up to 1000 mg per liter each, more typically up to 500, 300, 150 or 100 mg per liter each. The concentration of each ion in the beverage composition may vary. For example, a typical embodiment of a carbonated beverage composition according to the present disclosure contains 390 mg potassium, 115 mg sodium, 50 mg magnesium and 100 mg calcium ions per liter.

Electrolyte-enhanced carbonated beverage compositions according to the present disclosure may be made, very generally speaking, by adding electrolytes to cooled water and carbonating the resultant electrolyte water solution.

The water may first be filtered (using methods known in the art of water purification, such as reverse osmosis, distillation, filtration, etc.) and chilled to about 50° F. or less, more typically to about 40° F. or less. Filtering dissolved solids and salts from the water starting material enhances the solubility of the added electrolytes, and by dissolving the electrolytes into cooled water (rather than room temperature or heated water), the electrolytes are more likely to stay in solution during subsequent processing and shipment of the resulting solution or beverage composition.

Electrolytes are added into the cooled water and mixed until substantially dissolved in the water. Electrolytes are substances which, when dissolved in water, separate into ionic species (anions and cations) which conduct electricity. The electrolytes added according to this present disclosure include at least a potassium source, a sodium source, a calcium source and a magnesium source, and may include other electrolyte components. Other components, such as vitamins, minerals, nutrients, flavors, etc. also may be added and dissolved in the water at this step. Any known and acceptable electrolyte source may be used, including dipotassium phosphate, potassium bicarbonate, potassium carbonate, potassium chloride, potassium citrate, potassium phosphate and combinations and sub-combinations thereof as the potassium source; disodium phosphate, sodium bicarbonate, sodium chloride, sodium citrate and combinations and sub-combinations thereof as the sodium source; calcium carbonate, calcium chloride, calcium citrate, calcium gluconate, calcium lactate, calcium lactate gluconate, calcium phosphate and combinations and sub-combinations thereof as the calcium source; and magnesium carbonate, magnesium chloride, magnesium lactate and combinations and sub-combinations thereof as the magnesium source.

The electrolytes may be added and substantially dissolved individually, together or sequentially, into the cooled water, or may be combined together to form a mixture of electrolytes that is added and substantially dissolved into the cooled water.

The resulting electrolyte water solution may then be carbonated, typically by dissolving carbon dioxide under pressure into the electrolyte water solution. The electrolyte water solution may be carbonated and then bottled (typically with a top off of carbon dioxide to maintain pressure in the bottle), or be provided as a premix composition to be carbonated later (e.g., at home, at a bar or restaurant). The electrolyte water solution may be cooled or maintained at about 50° F. or less to facilitate the dissolution of carbon dioxide into the electrolyte water solution.

The operations described herein may be performed in any order, unless otherwise specified, and embodiments of the disclosure may include additional or fewer operations than those disclosed herein. Moreover, when one element or step is described as being responsive to another element or step, it will be understood that the elements or steps may be coupled directly or indirectly.

It will be further understood that the articles "a", "an", "the" and "said" are intended to mean that there may be one or more of the elements or steps present. The terms "comprising", "including" and "having" are intended to be inclusive and mean that there may be additional elements or steps other than those expressly listed.

The foregoing description has been presented for the purpose of illustrating certain aspects of the present disclosure and is not intended to limit the disclosure. Persons skilled in the relevant art will appreciate that many additions, modifications, variations and improvements may be implemented in light of the above teachings and still fall within the scope of the present disclosure.

I claim:

1. A process of preparing a carbonated beverage composition comprising:

cooling water to a temperature of about 50° F. (10° C.) or below thereby forming cooled water;

adding electrolytes to the cooled water, wherein the electrolytes include a potassium salt source, a sodium salt source, a calcium salt source, and at least about 172 mg magnesium carbonate per liter of cooled water, none of which is a sulfate-containing salt, to form an electrolyte mixture;

mixing the electrolytes in the cooled water and pressurizing the electrolyte mixture with carbonation to provide a clear carbonated beverage composition having a total cation fluid concentration of at least about 10 mmol/L and substantially no undissolved solids.

2. The process of claim 1, wherein the adding the electrolytes to the cooled water comprises adding a mixture of the electrolytes to the cooled water, wherein the mixture of electrolytes is formed by combining the potassium salt source, sodium salt source, calcium salt source and magnesium carbonate together.

3. The carbonated beverage composition of claim 1, wherein the concentration of artificial flavoring in the composition is substantially 0 mmol/L.

4. The carbonated beverage composition of claim 1, wherein the concentration of artificial coloring in the composition is substantially 0 mmol/L.

5. The process of claim 1, further comprising filtering the cooled water before adding the electrolytes.

6. The process of claim 1, wherein the water is cooled to a temperature of 40° F. (about 4.4° C.) or below.

7. The process of claim 1, further comprising filling a vessel with the carbonated beverage composition and supplying said vessel for commercial sale.

8. The process of claim 1, wherein the concentration of cations in the carbonated beverage composition is at least about 600 mg/L.

9. The process of claim 1, wherein the potassium salt source is potassium bicarbonate, the sodium salt source is sodium bicarbonate, the calcium source is calcium lactate gluconate, and the magnesium salt source is magnesium carbonate.

10. The process of claim 1, wherein the concentration of calcium cations in the carbonated beverage composition is at least about 100 mg/L.

11. The process of claim 5, wherein the concentration of potassium cations in the carbonated beverage composition is at least about 390 mg/L, the concentration of sodium cations in the carbonated beverage composition is at least about 115 mg/L, and the concentration of calcium cations in the carbonated beverage composition is at least about 100 mg/L.

\* \* \* \* \*